(12) United States Patent
Fiessler

(10) Patent No.: US 11,413,674 B2
(45) Date of Patent: Aug. 16, 2022

(54) DEFORMING MACHINE

(71) Applicant: Fiessler Elektronik GmbH & Co. KG, Aichwald (DE)

(72) Inventor: Lutz Fiessler, Aichwald (DE)

(73) Assignee: Fiessler Elektronik GmbH & Co. KG, Aichwald (DE)

( * ) Notice: Subject to any disclaimer, the term of this patent is extended or adjusted under 35 U.S.C. 154(b) by 21 days.

(21) Appl. No.: 16/844,619

(22) Filed: Apr. 9, 2020

(65) Prior Publication Data

US 2020/0324332 A1 Oct. 15, 2020

(30) Foreign Application Priority Data

Apr. 10, 2019 (EP) .................... 19168398

(51) Int. Cl.
*B21D 55/00* (2006.01)
*B30B 15/28* (2006.01)
*B21D 22/02* (2006.01)
*F16P 3/14* (2006.01)

(52) U.S. Cl.
CPC ............ *B21D 22/02* (2013.01); *B30B 15/285* (2013.01); *F16P 3/144* (2013.01)

(58) Field of Classification Search
CPC .. B21D 55/00; B21D 5/02; F16P 3/144; F16P 3/005; B30B 15/285; B30B 15/045
USPC ....................................... 100/348; 29/407.04
See application file for complete search history.

(56) References Cited

U.S. PATENT DOCUMENTS

| | | | |
|---|---|---|---|
| 10,197,219 B1 | 2/2019 | Boyer, Jr. | |
| 2015/0314364 A1* | 11/2015 | Fiessler | F16P 3/144 72/1 |
| 2016/0151820 A1* | 6/2016 | Woidasky | B21D 5/0272 72/20.2 |

FOREIGN PATENT DOCUMENTS

| | | | |
|---|---|---|---|
| EP | 0 789 182 A1 | 8/1997 | |
| EP | 2 431 650 A1 | 3/2012 | |
| EP | 2431650 A1 * | 3/2012 | ............. F16P 3/144 |
| EP | 3 101 330 A1 | 12/2016 | |
| EP | 3 321 557 A1 | 5/2018 | |

* cited by examiner

*Primary Examiner* — Jimmy T Nguyen
(74) *Attorney, Agent, or Firm* — Hoffmann & Baron LLP

(57) ABSTRACT

A deforming machine (1) with a machine frame (2), on which an upper tool (4) and a lower tool (5) are arranged, which form a working gap (8) of variable size, with a first optical safety light barrier (20) for securing a first safety space (28) adjacent to the working gap (8) and with a second optical safety light barrier (30) for securing a second safety space (31), which is located in front of a largest surface (18) of the upper tool (4). The second optical safety light barrier (30) is designed for monitoring a third safety space (51) which extends downwards beyond the end face (6) of the upper tool (4) facing the lower tool (5) along the movement path (14) in the direction of the lower tool (5), so that a projection of the third safety space (51) onto the working gap (8) covers at least a section of the working gap (8).

18 Claims, 3 Drawing Sheets

DEFORMING MACHINE

BACKGROUND OF THE INVENTION

The invention relates to a deforming machine with a machine frame, on which an upper tool and a lower tool are arranged, at least one of which is accommodated on the machine frame so as to be relatively movable along a movement path, wherein mutually oppositely arranged end faces of the upper tool and the lower tool form a working gap of variable size and wherein a first optical safety light barrier is associated with the upper tool or the lower tool, which is designed for securing a first safety space, in particular a cuboidal first safety space adjacent to the working gap, and which comprises a first beam source for providing first safety light beams and a first light receiver for receiving the first safety light beams, the first beam source and the first light receiver being arranged on opposite sides of the working gap, the machine frame or the upper tool is assigned a second optical safety light barrier, which comprises a second beam source for providing second safety light beams and a second light receiver for receiving the second safety light beams and which is used for securing a, in particular cuboidal, second safety space, which is located in front of a largest surface of the upper tool, so that a projection of the second safety space onto the upper tool covers at least a section of the upper tool, the second beam source and the second light receiver being arranged on mutually opposite boundary surfaces of the second safety space, which are aligned in particular in the vertical direction.

A deforming machine is known from EP 3 321 557 A1, which has a machine frame on which a pair of tools is arranged, wherein one of the tools is arranged on the machine frame so as to be relatively movable along a movement path and the tools form a working gap of variable size and wherein a first optical safety light barrier is associated with the movable tool, which comprises a first beam source for providing a first beam parallel to the end faces of the tools and a first light receiver for receiving the first beam, and wherein a second optical safety light barrier is associated with one of the tools and comprises a second beam source for providing a second beam and a second light receiver for receiving the second beam for securing a side face of the tool which is aligned normal to the movement path and adjoins the end face.

SUMMARY OF THE INVENTION

The task of the invention is to provide a deforming machine and a method of operating a deforming machine with which simplified operation and improved protection of the deforming machine can be realized.

This task is solved according to a first aspect of the invention for a deforming machine of the type mentioned above wherein the second safety light barrier is designed for monitoring a third safety space which extends downwards beyond the end face of the upper tool facing the lower tool along the movement path in the direction of the lower tool, so that a projection of the third safety space onto the working gap covers at least a section of the working gap.

The task of the first safety light barrier is to monitor the first safety space directly adjacent to the end face of the upper tool facing the lower tool in order to be able to detect an operator's intervention in the narrowing working gap during an approach movement of the upper tool towards the lower tool (or an approach movement of the lower tool towards the upper tool) and to switch off the driving mechanism for the tool from the group: upper tool, lower tool, mounted on the machine frame so as to be relatively movable in each case, in order to prevent accidents. Such a system is marketed by the applicant under the product name AKAS and comprises a first optical safety light barrier designed to protect a first safety space adjacent to the working gap, in particular a cuboidal first safety space. This first optical safety light barrier comprises a first beam source for providing first security light beams and a first light receiver for receiving the first security light beams and can also be described as a light barrier or light grid. The first safety space is bounded laterally by the first beam source and the first light receiver, which are arranged opposite one another. Depending on the configuration of the first beam source and the first light receiver, the first safety space can be described by a bounding geometry extending between the beam source and the light receiver and profiled with an oval or circular-cylindrical or rectangular or square cross-section.

The task of the second optical safety light barrier is to monitor a second safety space, in particular a cuboidal second safety space, which is located in front of a largest surface or front of the upper tool. The second safety space is a section of space facing the operator in which, during a machining operation, a workpiece to be picked up between the upper tool and the lower tool, which is to be deformed in the course of a bending operation, can perform an upward movement and thereby approach a largest surface of the upper tool facing the operator. For example, a sheet metal part to be processed is bent in the working gap by the interaction of the upper tool with the lower tool, whereby a part of the workpiece initially facing the operator moves on a circular path towards the largest surface of the upper tool. There is a risk that an operator grasping the sheet metal part for stabilization purposes will injure his hands. There is therefore a risk of accidents in this section of space, so that in order to prevent accidents, this section of space, also known as the second safety space, is monitored by means of the second optical safety light barrier. The second safety space is preferably dimensioned in such a way that a projection of the second safety space in a spatial direction transverse to the movement path and preferably normal to the front of the upper tool and to the front of the upper tool at least almost completely covers the upper tool.

Furthermore, the second optical safety light barrier now performs further tasks by monitoring a third safety space which extends downwards beyond the end face of the upper tool facing the lower tool along the movement path in the direction of the lower tool. Accordingly, a projection of the third safety space onto the working gap, i.e. onto a projection plane extending between the end face of the upper tool facing the lower tool and the end face of the lower tool facing the upper tool and spanning the working gap, covers at least one section of the working gap, in particular a strip-shaped section of the working gap.

A first objective for monitoring the third safety space is to trigger a predeterminable relative movement of the respective tool, which is movably arranged on the machine frame, from the group: upper tool, lower tool, without the need to actuate a foot pedal or a hand switch. Rather, it can be provided, for example, that an operator feeds a workpiece to be machined into the working gap or removes it from the working gap, thereby triggering a relative movement of the deforming machine.

A second objective for the monitoring of the third safety space is to secure a pre-settable relative movement of a workpiece stop that can be moved relative to the lower tool in order to determine an insertion depth for the workpiece.

Here it is to be avoided that an operator can intervene in a space between the lower tool and the workpiece stop during a (usually horizontal) movement of the workpiece stop, since there is a danger of an injury of the hand of the operator when located between the workpiece stop and the lower tool during the adjustment of the workpiece stop.

Advantageous further developments of the invention are the subject of the subclaims.

It is useful if the upper tool arranged on the machine frame in a relatively movable manner and/or the lower tool received on the machine frame in a relatively movable manner is assigned a driving mechanism for initiating a relative movement along the movement path, the driving mechanism and the first safety light barrier and the second safety light barrier being connected to a safety control, which is designed for actuating and switching off the driving mechanism as a function of signals from the first safety light barrier and the second safety light barrier, the safety controller being designed for actuating the driving mechanism in order to reduce the distance between the upper tool and lower tool when a predeterminable distance between the upper tool and lower tool is present and when an object enters the third safety space.

As an example, the driving mechanism is designed as an electric direct drive, an electric gear drive or an electrohydraulic drive and provides a linear movement for the upper tool and/or the lower tool along the movement path. For this purpose, the driving mechanism comprises in particular an electric motor which is electrically connected to a safety control system, which can be designed as a programmable logic controller (PLC).

The safety control is designed for a safety-oriented control of the driving mechanism and comprises suitable switching means for this purpose, for example for a two-channel cut-off of the energy supply for the driving mechanism. In order to make a decision as to whether a safety-oriented shutdown of the driving mechanism is necessary, the safety control is electrically connected to the first optical safety light barrier and to the second optical safety light barrier and is designed to receive sensor signals which are provided by the first optical safety light barrier and by the second optical safety light barrier. It is preferably provided that processing of the individual sensor signals, which are provided by sensors of the respective optical safety light barrier, for example, is carried out locally in the respective optical safety light barrier, since a circuit device optimized directly for this processing task can be provided here. In this case, the respective optical safety light barrier only outputs a sensor signal to the security control system if there is a pre-settable attenuation of the security light beams.

Optionally, the optical safety light barrier and/or the safety control system can be designed to switch off the first optical safety light barrier and/or the second optical safety light barrier in certain areas as a function of a predeterminable procedure (fade-out) in order not to interrupt a scheduled sequence of a deformation process for a workpiece by foreseeable interruptions of safety light beams of the first optical safety light barrier and/or the second optical safety light barrier.

In addition, the safety controller can be designed for interrogation of the second optical safety light barrier with respect to the third safety space in order to be able to recognize, on the basis of interruptions of safety light beams within the third safety space or on the basis of a resulting sensor signal of the second optical safety light barrier, whether a workpiece is being correctly fed in the direction of the working gap within the third safety space or whether a workpiece is being removed from the working gap and safety light beams within the third safety space are interrupted in the process. To simplify the processing of sensor signals which are provided in the second optical safety light barrier by the sensors provided there as a function of the incoming safety light beams, it is preferably provided that no distinction is made within the second optical safety light barrier between the second safety space and the third safety space. Instead, all sensor signals provided in the second optical safety light barrier by the sensors provided there are always processed.

As an example, it may be provided that in the event of an object penetrating, in particular when a workpiece is fed into the trigger section of the third security space, the driving mechanism is activated by the security control system if it can be determined on the basis of a sufficiently large attenuation of the security light beams of the second optical safety light barrier that the workpiece is being fed into the third security space. In this case it is assumed that a deformation movement by reducing the working gap between the upper tool and the lower tool is desired so that this deformation movement can be carried out without actuating a foot pedal or a hand switch.

Alternatively, it may be provided that a deformation movement by reducing the working gap between the upper tool and the lower tool is only triggered when an object first enters the third safety space and is subsequently removed from the third safety space. With this type of triggering of the deformation movement, it is assumed, for example, that an operator has gripped a workpiece and introduced it into the third safety space, whereby he causes an attenuation of the safety light beams in the third safety space with his hands, which is detected by the second optical safety light barrier as the penetration of an object into the third safety space. After the operator has placed the workpiece in the working gap, he can release the workpiece, which is detected as removal of an object from the third safety space, so that the desired deformation movement can then be initiated.

In further embodiment of the invention, it is intended that the safety control system is designed to switch off the driving mechanism during a reduction in the distance between the upper tool and lower tool when an object enters the first safety space or the second safety space. If an object penetrates into the first or second safety space, it is assumed that this is a hazardous situation, so that either an immediate switch-off of the driving mechanism or a changeover of a working direction for the driving mechanism is provided.

In addition or alternatively it may be provided that the safety control is designed for a switch-off of an actuator with which a distance between the lower tool and a workpiece stop, in particular a horizontally adjustable workpiece stop, is set. The actuator can be activated, for example, if the driving mechanism is deactivated and the third safety space is monitored by the second optical safety light barrier. If an object enters the third safety space, it is assumed that this is a hazardous situation in which an operator is exposed to a risk of crushing due to a reduction in the distance between the workpiece stop and the lower tool, so that either immediate shutdown of the actuator or a change of a working direction is provided for the actuator.

Preferably, it is provided that the upper tool is received in a relatively movable manner on the machine frame, that the first optical safety light barrier is arranged on the upper tool and that the second optical safety light barrier is arranged on the machine frame. In this configuration, the second optical safety light barrier preferably extends from a highest position, which can assume an upper edge of the upper tool when the working gap is fully open, in a vertical direction downwards at least as far as the end face of the lower tool facing the upper tool.

Alternatively, provision is made for the upper tool to be received in a relatively movable manner on the machine frame, for the first safety light barrier to be arranged on the upper tool and for the second safety light barrier to be arranged on the first safety light barrier.

In the case of an advantageous further development of the invention, it is provided that an adjusting device is arranged between the upper tool and the first safety light barrier, which is designed for adjusting a position of the first safety light barrier relative to the upper tool along the movement path. This makes it possible to adjust a position of the first optical safety light barrier with respect to an end face of the upper tool facing the lower tool, since different upper tools can also have different counts in the direction of movement.

It is useful if the first optical safety light barrier and the second optical safety light barrier are designed to protect a front face of the upper tool and/or the lower tool facing the operator.

The task of the invention is solved according to a second aspect of the invention by a method of operating a deforming machine comprising the following steps: monitoring a first safety space, which is arranged adjacent to one of the opposing end faces of an upper tool and a lower tool, with a first optical safety light barrier, wherein the monitoring of the first safety space takes place during a reduction in distance between the upper tool and the lower tool within a predeterminable first distance interval for a distance between the upper tool and the lower tool and wherein the reduction in distance is terminated when an object enters the first safety space; monitoring a second safety space which is located in front of a largest surface of the upper tool and which, in the case of a projection transverse to the movement path, at least partially covers a largest surface of the upper tool, having a second optical safety light barrier, the monitoring of the second safety space during a reduction in the distance between the upper tool and the lower tool being carried out within a predeterminable second distance interval for a distance between the upper tool and the lower tool, and the reduction in distance being terminated when an object penetrates into the second safety space; monitoring a third safety space, which is located upstream of the working gap and which at least partially covers the working gap in the case of a projection transverse to the movement path, with the second optical safety light barrier, the monitoring of the third safety space taking place during a standstill phase for the upper tool and the lower tool and a change in distance between the upper tool and the lower tool being initiated, when an object enters the third safety space or leaves the third safety space after an object has entered the third safety space and/or wherein a change in distance between a workpiece stop relative to the upper tool or the lower tool is terminated when an object enters the third safety space.

Preferably, the first distance interval is dimensioned in such a way that the distance between the upper tool and the lower tool is greater than a sum of a braking distance for the upper tool from a high approach speed, also referred to as high-speed or maximum speed, for the upper tool to the lower tool and the thickness of the workpiece stored in the safety control. As soon as the distance between the upper tool and the lower tool is equal to or smaller than this sum, the driving mechanism usually switches over to a significantly slower approach speed, also known as creep speed, between the upper tool and the lower tool, at which it is assumed that this does not pose any danger to the operator.

Preferably, the second distance interval is dimensioned in such a way that the distance between the upper tool and the lower tool is equal to or smaller than the thickness of the workpiece, so that monitoring of the second safety space is carried out during the actual deformation process (in particular bending process) for the workpiece.

In a further configuration of the method, it is provided that a reduction in the distance between the upper tool and the lower tool is only initiated when an object enters the third safety space if a distance between the upper tool and the lower tool lies within a predeterminable third distance interval.

A lower limit of the third distance interval is preferred to a lower limit of the first distance interval in order to allow an advantageous feeding of the workpiece into the working gap.

In further modification of the method it is provided that a reduction in distance between the upper tool and the lower tool is only initiated when an object enters the third safety space if a distance between the upper tool and the lower tool lies within a predeterminable fourth distance interval. This ensures that, after the workpiece has been fed into the third safety space and the approach movement between the upper tool and the lower tool has begun, there is still sufficient time to bring the workpiece into the correct position relative to the upper tool and the lower tool for the deformation process.

In further modification of the procedure, it is intended that a minimum distance amount of the first distance interval (lower interval limit) is greater than or equal to a maximum distance amount of the second distance interval (upper interval limit). This means that monitoring of the second fuse space is only carried out if monitoring of the first fuse space is not continued because the upper tool and lower tool are approaching each other. Accordingly, the data initially available for monitoring the first backup space in safety control is available for monitoring the second backup space after the lower interval limit of the first interval has been passed.

In further modification of the procedure it is intended that a minimum distance amount of the third distance interval is greater than or equal to a maximum distance amount of the second distance interval.

The fourth distance interval is also equal to the second distance interval.

BRIEF DESCRIPTION OF THE DRAWINGS

An advantageous embodiment of the invention is shown in the drawing. Here shows.

DETAILED DESCRIPTION

Figure 1:
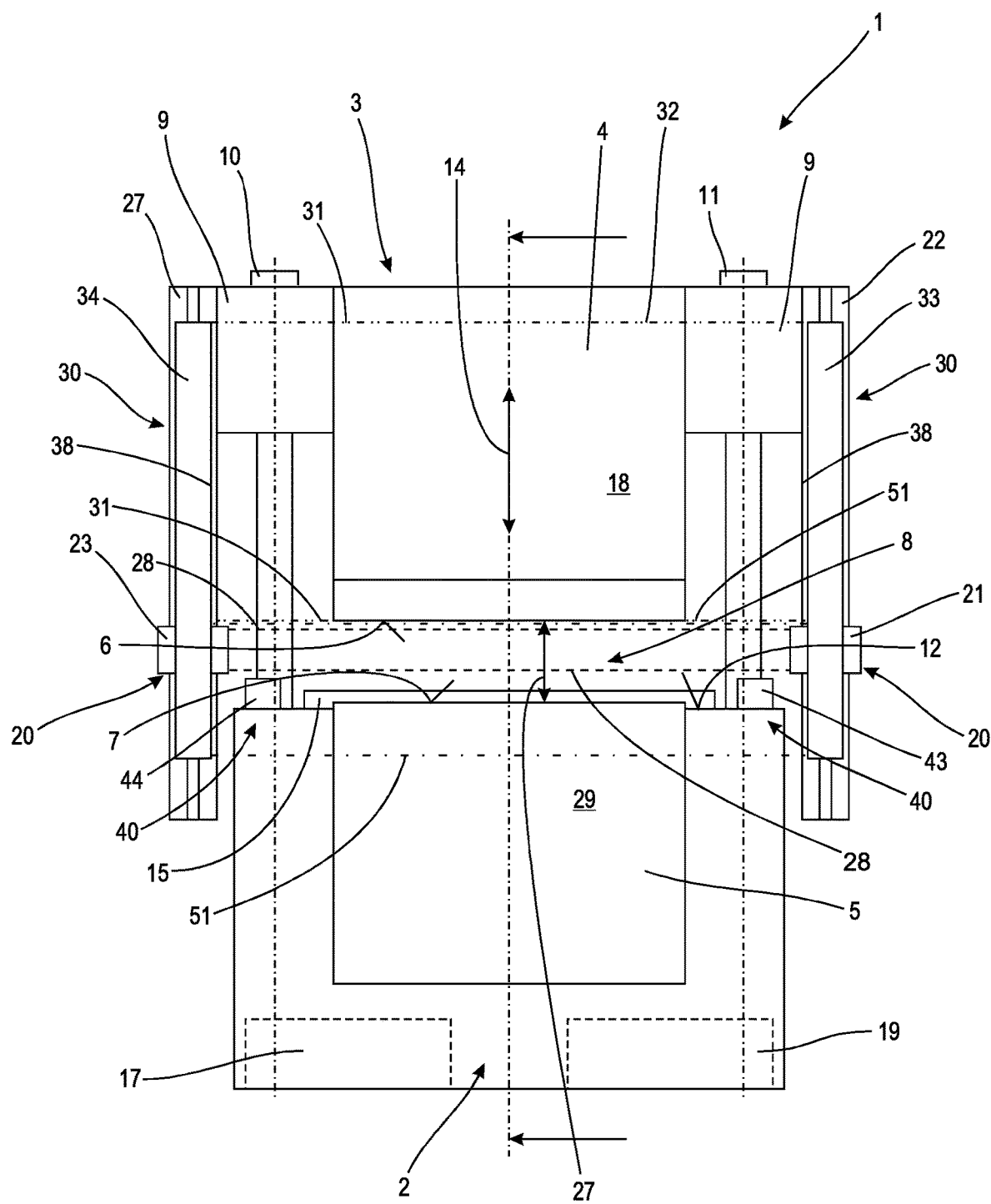
FIG. 1 a front view of a deforming machine with two optical safety light barriers, the components of which are arranged on both sides of the machine frame, FIG. 2 a lateral sectional view of the deflection device as shown in FIG. 1, and FIG. 3 a schematic top view of the deforming machine.
Figure 2:
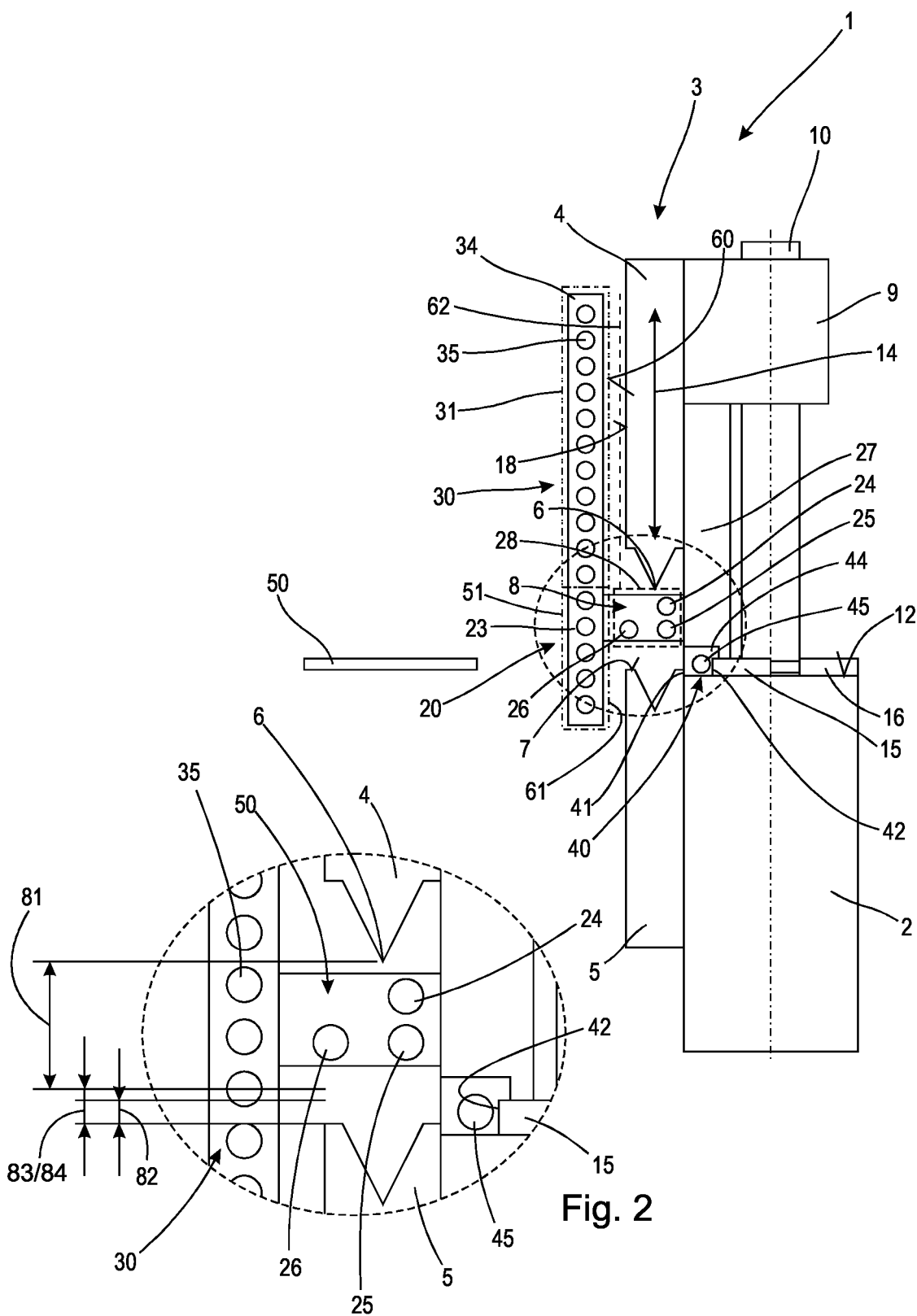
Figure 3:
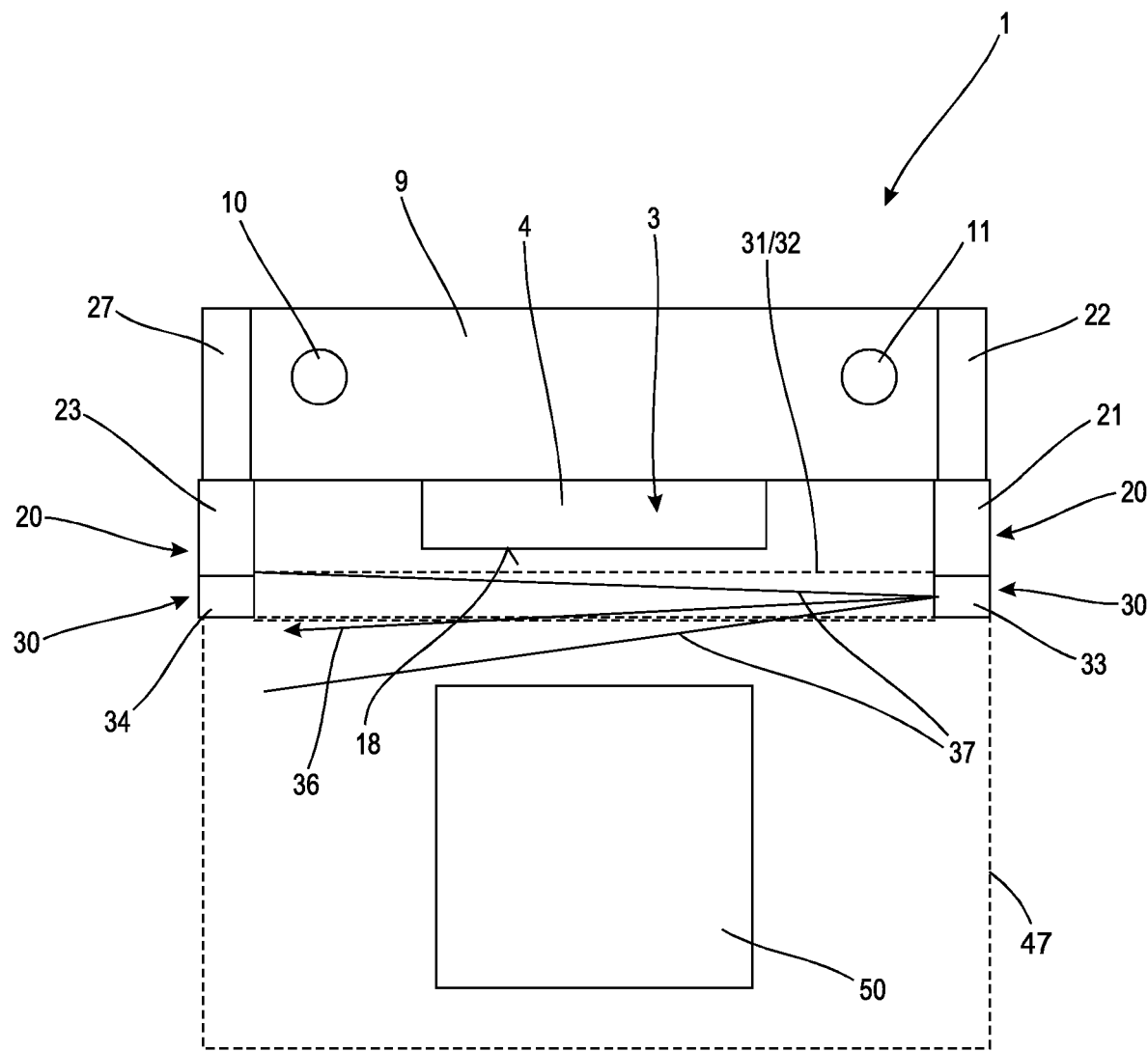

A deforming machine 1 shown purely schematically in FIGS. 1 to 3 comprises a machine frame 2 on which a pair of tools 3 is arranged. For example the deforming machine 1 is designed as a press brake and enables sheet metal parts to be deformed, for example by bending between an upper tool 4 and a lower tool 5 of the tool pair 3. As an example, both the upper tool 4 and the lower tool 5 are each designed as a plane-parallel plate, which are provided with a corresponding profile on opposite end faces 6, 7. The two end faces 6, 7 of the upper tool 4 and the lower tool 5 limit a vertical extension of the variable-size working gap 8 of tool pair 3 and determine a distance 27.

As an example, the lower tool 5 is fixed in a stationary position on the machine frame 2, while the upper tool 4 is movably mounted on the machine frame 2 and for this purpose is fixed by means of a tool holder 9 on two height-adjustable support columns 10, 11 mounted on the machine frame 2. As an example, the support columns 10, 11 are piston rods of hydraulic cylinders which are accommodated in the machine frame 2 and which enable an adjustment of a vertical position of the upper tool 4 along a movement path 14 which is aligned purely by way of example in the vertical direction. As can be seen from the illustration in FIG. 1, the upper tool 4 and the lower tool 5 are designed with a smaller width than the machine frame 2.

In a design not shown, both tools are height adjustable. In a design not shown either, only the lower tool is height adjustable.

According to FIG. 2 a workpiece stop 15, which is arranged on an upper side 12 of the machine frame 2 and is purely by way of example bar-shaped, can be moved towards or away from the working gap 8 with the aid of a movable piston rod 16 of a compactly designed hydraulic cylinder 46, which is exemplarily used as an actuator, in order to serve as a depth stop for a workpiece 50, which is plate-shaped in a raw state before deformation, as also shown in FIG. 2.

The deforming machine 1 is equipped with a total of three optical safety light barriers 20, 30, 40 as shown in FIGS. 1 and 2, which are explained in more detail below. Each of the three optical safety light barriers 20, 30, 40 is designed to monitor a predeterminable, in particular cylindrical or cuboidal, section of space in which an intervention of an operator would result in a hazard to the operator at least during certain operating phases of the deforming machine 1.

During an intended use of the deforming machine 1, the operator who uses the deforming machine 1 exclusively works in a spatial section which is located in front of the deforming machine 1 and which adjoins those front sides 18, 29 of the upper tool 4 and of the lower tool 5 which are remote from the tool holder 9 or the machine frame 2, this working zone 47 is shown in FIG. 3. As an example, it can be provided that a spatial area behind the deforming machine 1 that is turned away from the operator is protected by a barrier like a fence that is not shown in detail. However it cannot be excluded that the operator who is working in the working zone 47 reaches hazardous areas by handling workpieces 50 during the intended use of the deforming machine 1. The hazard of such an area may be related with an approach movement of the upper tool 4 to the lower tool 5 in the working gap 8. A further hazard is related with the bending of the workpiece 50 resulting in an approach of a region of the workpiece 50 to a front side 18 of the upper tool 4 between workpiece 50 and the front side 18 of the upper tool 4. To ensure a safe usability of the deforming machine 1, the optical safety light barriers 20, 30 and 40 are provided.

The first optical safety light barrier 20 is designed to monitor a first safety space 28 in front of the working gap 8, shown purely by way of example with a rectangular profile (in FIGS. 1 and 2 with a dotted line), and comprises a first beam source 21, which is designed purely by way of example to provide a total of three unspecified light beams, in particular laser beams. The light beams of the beam source 21 are aligned at least substantially parallel to the longest edges of the end faces 6, 7 of the upper tool 4 and the lower tool 5.

The first beam source 21 is coupled to an adjusting device 22, which is designed, for example electrically operable threaded spindle drive and enables a change in a vertical positioning of the first beam source 21 relative to the tool holder 9 and the upper tool 4 attached thereto. Since the adjusting device 22 is coupled to the tool holder 9, the first beam source 21 always executes the movement of the tool holder 9, unless a movement superimposition in the same or opposite directions takes place by a corresponding control of the adjusting device 22.

The adjusting device 22 is electrically connected in a manner not shown in more detail to a purely schematically represented safety control 17, which is exemplarily designed as a separate component but can also be integrated in the first optical safety light barrier 20, wherein the safety control is designed for adjusting a position of the first beam source 21 relative to the tool holder 9 and the upper tool 4 attached thereto.

A first light receiver 23 is arranged opposite the first beam source 21, which comprises purely exemplary three sensor elements 24, 25 and 26. Each of the sensor elements 24, 25 and 26 is designed to receive a corresponding light beam which is provided by the first beam source 21 and which is not further specified. In order to ensure that the first light receiver 23 is always positioned opposite the first beam source 21, the first light receiver 23 is attached in the same way as the first beam source 21 to an adjusting device 27, which is electrically connected in an unspecified manner to the safety control 17 and can be controlled by the safety control 17 in synchronism with the adjusting device 22.

In addition, both the first beam source 21 and the first light receiver 23 are electrically connected in an unspecified manner to the safety control unit 17, which on the one hand selectively controls the unspecified light sources of the first beam source 21 and on the other hand evaluates sensor signals of the sensor elements 24, 25, 26 of the first light receiver 23. Alternatively, the evaluation of sensor signals of the first light receiver 23 and a possible temporary non-observance of sensor signals of individual sensor elements 24, 25, 26 or of groups of sensor elements 24, 25, 26 (fade-out) is carried out directly in the first optical safety light barrier 20.

Furthermore, the safety control 17 is designed for influencing the movement of the upper tool 4 as described in more detail below.

The second optical safety light barrier 30 is provided for monitoring a second safety space 31 which is shown purely schematically (in FIGS. 1 and 2 with a dashed colon line), has a cuboid shape and extends with a largest surface 60 parallel to the front side 18 of the upper tool 4 facing the operator area. Here, purely as an example, an edge 32 of the largest surface 60 of the safety space 31 extends in the horizontal direction between a second beam source 33 and a second light receiver 34, while a side edge 38 of the largest surface of the second safety space 31 extends in the vertical direction parallel to the movement path 14. As an example, it is intended that a projection 62 of the second safety space 31 on the front 18 of the upper tool 4, which is shown purely schematically in FIG. 2, at least almost completely covers the upper tool 4.

The second light receiver 34 shown in FIG. 2 is located adjacent to a narrow side of the second safety space 31, the surface of which is bounded by the side edge of the second safety space 31 and by a horizontally extending upper edge and a horizontally extending lower edge of the second safety space 31.

In addition, the second optical safety light barrier 30 is provided for monitoring a third safety space 51, which is shown in FIGS. 1 and 2 with a dotted line and is exemplarily located adjacent to the second safety space 51 and is directly connected to the second safety space 31 in a vertical direction downwards and has a cuboid shape in the same way as the second safety space 31. The third safety space 51 thus extends with a largest surface 61 parallel to the front side 29 of the lower tool 5 facing the operator area.

The second beam source 33 is designed to provide a light grid or light curtain in the direction of the second light receiver 34. The light beams of the second beam source 33 penetrate the second safety space 31 and the third safety space 51 in such a way that for each space volume section of the second safety space 31 and the third safety space 51 it is ensured that a penetration of a finger or hand of an operator causes an attenuation of the light beams received by the line-like arranged sensor elements 35 of the second light receiver, which is noticeable in a significantly changed sensor signal of the light receiver 34.

For an evaluation of the sensor signal, the second light receiver 34 is electrically connected to the safety control 17 in a manner not shown in detail. Furthermore, the second beam source 33 is also electrically connected to the safety control 17 in a manner not described in detail in order to enable selective provision or switching off of the light beams which are to pass through safety space 31. Alternatively, the evaluation of sensor signals of the sensor elements 35 and a possible temporary non-observance of sensor signals of individual sensor elements 35 or of groups of sensor elements 35 (fading out) is carried out directly in the second optical safety light barrier 20.

As an example, it is provided that the first optical safety light barrier 20 and the second optical safety light barrier 30 monitor the first safety space 28 and the second safety space 31 during a movement of the upper tool 4 relative to the lower tool 5, in order to reduce or eliminate a hazard potential during the approach movement between the upper tool 4 and the lower tool 5 and a possible approach movement (due to the bending of the workpiece 50) between a section of the workpiece 50 and the front side 18 of the upper tool 4 for an operator. Furthermore, it is provided as an example that the second optical safety light barrier 30 monitors the third safety space 51 in particular when there is no relative movement between the upper tool 4 and the lower tool 5.

It is preferably provided that the second optical safety light barrier 30 monitors the second safety space 31 and the third safety space 51 while the upper tool 4 is stationary in relation to the lower tool 5. If the workpiece 50 penetrates into the second safety space 31 and/or into the third safety space 51, the safety control 17 can provide a signal for putting the deforming machine 1 into operation, so that a subsequent deformation process for the workpiece 50 can be effected solely by feeding the workpiece 50 into the second safety space 31 and/or into the third safety space 51.

Alternatively, it can be provided that a sequence of an intrusion of an object into the second safety space 31 and/or into the third safety space 51 and a subsequent removal of the object from the second safety space 31 and/or the third safety space 51 results in the provision of a signal for putting the deforming machine 1 into operation by the safety controller 17. Such a procedure is to be preferred in particular if the workpiece 50 alone cannot guarantee reliable attenuation of the safety light beams of the second optical safety light barrier 30 (for example in the case of a small thickness or small size of the workpiece 50), so that an intervention of an operator with his hands in the second safety space 31 and/or in the third safety space 51 is necessary to cause a provision of a sensor signal by the second optical safety light barrier 30 to the safety controller 17. In this case it is advantageous if the reduction in distance between the upper tool 4 and the lower tool 5 only takes place after the operator has removed his hands from the second safety space 31 and/or the third safety space 51.

It is preferable that the reduction of the distance between the upper tool 4 and the lower tool 5 is only effected by the safety control 17 if the penetration and removal of the object takes place within a pre-determinable time interval in order to avoid possible operating errors of the deforming machine 1.

In addition or alternatively, during a standstill phase for the relative movement between the upper tool 4 and the lower tool 5 and a relative movement of the workpiece stop 15 with respect to the lower tool 5, it is possible to provide for the use of the second optical safety light barrier 30 for monitoring the third safety space 51. The safety control 17 can, for example, in the event of an interruption or attenuation of the safety light beams of the second optical safety light barrier 30, come to the conclusion that an operator is intervening in the third safety space 51, with the result that there is a risk of injury for the operator due to the possible approach movement of the workpiece stop 15 towards the lower tool 5, so that in this case the hydraulic cylinder 46 serving as the actuator is switched off.

As can be seen from the illustration in FIG. 3, an optical axis 36 of the second light source 33 is aligned at an acute angle to a distance between the second light source 33 and the second light receiver 34 to avoid reflections of marginal light beams 37 at the front 18 of the upper tool 4.

In the design form of the deforming machine 1 shown in FIGS. 1 to 3, a third optical safety light barrier 40 is provided purely as an example to secure a space area between a rear or rear edge 41 of the lower tool 5 and a front or front edge 42 of the workpiece stop 15. The third optical safety light barrier 40 comprises a third beam source 43 as well as a third light receiver 44, which are arranged opposite one another in a stationary manner on the machine frame 2. Here the third beam source 43 is designed to provide a non-specified light beam, in particular a laser beam, which is aligned parallel to the front face 7 of the lower tool 5 and which strikes a sensor element 45 of the third light receiver 44, provided that no obstacle is arranged between the third beam source 43 and the third light receiver 44. The third beam source 43 and the third light receiver 44 are electrically connected in an unspecified manner to the safety control 17 which is designed for selective activation and deactivation of the third beam source and for processing the sensor signal provided by the third light receiver 44.

If there is an interruption of the optical path between the third beam source 43 and the third light receiver 44 when the third beam source 43 is activated, the third light receiver 44 does not provide the sensor signal which would have to occur without an interruption of the optical path. As a result, the safety control 17 detects a deviation between a setpoint value for the sensor signal and the actual value of the sensor signal and must therefore assume that an operator is endangered, so that the hydraulic supply for the hydraulic cylinder 46 is switched off to eliminate the potential danger.

If the second optical safety light barrier 30 is suitably designed and arranged, the third optical safety light barrier 40 can be dispensed with, since its task can be performed in a synergistic manner by monitoring the third safety space 51 during an adjusting movement for the workpiece stop 15 relative to the lower tool 5 with the aid of the second optical safety light barrier 30.

The following procedure can be provided for operation of the deforming machine 1: as a first step the deforming machine 1 is programmed with a programmable logic controller (PLC) 19, which is electrically connected to the safety controller 17 in an unspecified manner and which comprises an unspecified input means, for example a keyboard, for inputting programming commands. In the course of the programming of the deforming machine 1, it is possible, for example, to define up to what distance the upper tool 4 is to be brought closer to the lower tool 5 in order to deform the workpiece 50 to be accommodated between the two tools 4, 5 in the desired manner. In addition, during programming, a positioning for the workpiece stop 15 is also defined, which is then set during operation of the deforming machine 1 with the aid of the control 19 and the hydraulic cylinder 46.

During this setting procedure for the workpiece stop 15, either the third beam source 43 is activated by the safety control 17 and the sensor signal of the third light receiver 44 is processed by the safety control 17 in order to be able to switch off the hydraulic supply for the hydraulic cylinder in the event of an interruption of the optical path between the third beam source 43 and the third light receiver 44, thus eliminating a potential danger for an operator.

In addition or as an alternative, provision may be made to safeguard this adjustment operation for the workpiece stop 15 by means of the second optical safety light barrier 30 which can monitor the third safety space 51 and, in the event of an object entering the third safety space 51, to be able to cut off the hydraulic supply to the hydraulic cylinder and thus eliminate a potential danger to an operator.

After successful positioning of the workpiece stop 15, the third beam source 43 is deactivated—if it is present and used at all—and no further processing of the sensor signal of the third light receiver 44 in the safety control 17 takes place.

Since, in the course of programming the control 19, specifications were also made with regard to the upper tool 4 and the lower tool 5, the safety control 17 can set a position of the two optical safety light barriers 20 and 30 coupled with the setting device 22 so that these are in a favourable position for the subsequent machining process.

In a subsequent step, workpiece 50 can now be fed by an operator to the deforming machine 1. As an example, it is intended that the operator pushes the plate-shaped workpiece 50 in a horizontal direction into the working gap 8, whereby the workpiece 50 is placed on the front face 7 of the lower tool 5 and is pushed in a horizontal direction in the direction of the workpiece stop 15 into the working gap 8 until one front face of the workpiece 50 rests against the workpiece stop 15.

During this feeding of the workpiece into the working gap 8, if the workpiece 50 is sufficiently thick or if the operator intervenes in the third safety space 51, the light beams between the second beam source 33 and the second light receiver 34 are at least partially interrupted, which is to be understood as a trigger signal for starting a deformation operation, so that the safety control 17 can provide a signal to the programmable logic controller 19 for starting a relative movement of the upper tool 4 with respect to the lower tool 5.

As an example, it may be provided that the provision of this signal is only carried out in the case that an interruption of the safety light beams in the third safety space 51 is only due to the workpiece 50 (which, depending on the thickness of the workpiece 50, requires a corresponding resolution of the second optical safety light barrier 30). If there are still further attenuations or interruptions of light beams between the second beam source 33 and the second light receiver 34, in particular in the third safety space 51, the safety control 17 must assume that the operator is inadmissibly present in the third safety space 51, so that a start-up of the deforming machine 1 must be excluded with regard to an approach of the upper tool 4 to the lower tool 5.

Alternatively, it may be provided that the provision of this signal follows on interruption of at least part of the safety light beams in the third safety space 51 without a quantitative evaluation of the attenuation of the safety light beams of the second optical safety light barrier 30 being carried out. In this case, it is assumed that the operator does indeed intervene with his hands in the third safety space 51, but that there is no danger to the operator either because of the activated first optical safety light barrier 20 and/or because of a low approach speed between the upper tool 4 and lower tool 5, even if the distance between the upper tool 4 and the lower tool 5 is reduced.

In a further alternative procedure, it is provided that the signal only occurs after a close chronological sequence of an interruption of at least a part of the safety light beams in the third safety space 51 and a subsequent release of this part of the safety light beams in the third safety space 51. In this case it is assumed that the operator first engages with his hands in the third safety space 51 in order to insert the workpiece 50, but then removes his hands again and only then the distance between the upper tool 4 and the lower tool 5 decreases.

Preferably, depending on the type of triggering of the work cycle for the deforming machine 1, it can be selected—for example by programming the safety control 17 or in some other way—which safety-related measures (activation of the first optical safety light barrier, activation of the second optical safety light barrier, specification of the approach speed between the upper tool 4 and the lower tool 5) are taken to ensure the safety of the operator during operation of the deforming machine 1.

By providing the signal from the safety control 17, the control 19, with the interposition of the safety control 17, which can carry out a safety-related shutdown of the deforming machine in dependence on signals from the first optical safety light barrier 20 or the second optical safety light barrier 30, supplies the unspecified actuator (e.g. a hydraulic pump) for the support columns 10, 11 and the upper tool 4 coupled thereto in order to bring about a linear movement of the upper tool 4 along the movement path 14 in the direction of the lower tool 5.

In this phase, the two optical safety light barriers 20 and 30 move synchronously with the upper tool 4, whereby with the aid of the first optical safety light barrier 20, safety of the first safety space 28 upstream of the working gap 8 is effected in a known manner and, when the upper tool 4 approaches the lower tool 5, the individual light sources of the first beam source 21 are gradually switched off and sensor signals of the associated sensor elements 24, 25, 26 of the first light receiver 23 are blanked out (ignored) in the safety control 17.

As an example, it may be provided that during the approach of the upper tool 4 to the lower tool 5 no activation of the second optical safety light barrier 30 takes place and this activation is only carried out when the workpiece 50 is clamped between the upper tool 4 and the lower tool 5 without a deformation of the workpiece 50 having already occurred.

Furthermore, it can be provided that during a relative movement of the upper tool 4 with respect to the lower tool 5, a deactivation of that second beam source 33 and second light receiver 34 of the second optical safety light barrier 30 which monitor the third safety space 51 is carried out, since this means that the safety control 17 may provide additional capacities for monitoring the remaining second light receivers 34 of the second optical safety light barrier 30.

In addition, it is planned as an example to activate the second optical safety light barrier 30 by the safety control 17 as soon as the workpiece 50 is clamped between the upper tool 4 and the lower tool 5 and the deformation process begins. When the second optical safety light barrier 30 is activated, light beams are emitted from the second beam source 33 in such a way that they almost completely fill the second safety space 31 and impinge on the sensor elements 35 of the second light receiver 34. Here the safety control 17 is designed for an evaluation of a sensor signal of the second light receiver 34 in such a way that deviations of the sensor signal which exceed a predeterminable threshold value lead to a safety-related, in particular two-channel, switch-off of a power supply by the safety control 17 in order to prevent further movement of the upper tool 4. Preferably a sensitivity of the second optical safety light barrier 30 and/or of the safety control 17 for the sensor signals of the second light receiver 34 is set in such a way that a distinction can be ensured between a workpiece swivelling into the safety space 31 in the course of the deformation process and a manual intervention of an operator in the safety space 31 and a switching-off of the movement of the upper tool 4 is only carried out in the latter case.

In addition, it can be provided as a purely exemplary measure to increase the distance between the workpiece stop 15 and the lower tool 5 as soon as the workpiece 50 is clamped between the upper tool 4 and the lower tool 5 in order to prevent the workpiece 50 from jamming with the workpiece stop 15 during the deformation process.

If necessary, it may also be provided to move the combination of the two optical safety light barriers 20 and 30 with the aid of the associated adjusting devices 22, 27 from the position assumed when the upper tool 4 approaches the lower tool 5 until the workpiece 50 is clamped, during the further deformation process for the workpiece 50, for example in a vertical direction upwards and thus against the closing direction of the upper tool 4, in order to permit reliable monitoring of a higher safety space 31.

After the work cycle for the deforming machine 1 has been triggered, which leads to the reduction of the distance between the upper tool 4 and the lower tool 5, an intermediate stop for the reduction of the distance between the upper tool 4 and the lower tool 5 can be provided with a programmable duration shortly above the clamping point for the workpiece 50, irrespective of the type of triggering.

A first distance interval 80 is dimensioned in such a way that the distance between the upper tool 4 and the lower tool 5 is greater than a sum of a braking distance for the upper tool 4 from a high approach speed, also referred to as high-speed or maximum speed, for the upper tool 4 to the lower tool 5 and the thickness of the workpiece 50 stored in the safety control 17.

A second distance interval 81 is dimensioned in such a way that the distance between the upper tool 4 and the lower tool 5 is equal to or smaller than the thickness of the workpiece 50, so that monitoring of the second safety space 31 is carried out during the actual deformation process for the workpiece 50.

It may be provided that a reduction in the distance between the upper tool 4 and the lower tool 5 is only initiated when an object enters the third safety space 51 if a distance between the upper tool 4 and the lower tool 5 lies within a predetermined third distance interval 82. A lower limit of the third distance interval 82 equals a lower limit of the first distance interval 80 in order to allow an advantageous feeding of the workpiece 50 into the working gap 8.

It also may be provided that a reduction in distance between the upper tool 4 and the lower tool 5 is only initiated when the workpiece 50 enters the third safety space 51 if a distance between the upper tool 4 and the lower tool 5 lies within a predetermined fourth distance interval 83. This ensures that, after the workpiece 50 has been fed into the third safety space 51 and the approach movement between the upper tool 4 and the lower tool 5 has begun, there is still sufficient time to bring the workpiece 50 into the correct position relative to the upper tool 4 and the lower tool 5 for the deformation process.

As an example, the intermediate stop is made when a resulting gap width (current size of the working gap minus workpiece thickness) is less than 6 mm to allow positioning of workpiece 50 before workpiece 50 is clamped between upper tool 4 and lower tool 5 in the course of the further approach movement.

It is preferable to deactivate the first optical safety light barrier from the intermediate stop, as it is assumed that the operator can no longer intervene, in particular with his fingers, in the working gap 8.

Furthermore, after the end of the intermediate stop, in particular after reaching the clamping point, an activation of the second optical safety light barrier 30 is to be provided, since after reaching the clamping point for the workpiece 50, the forming movement for the workpiece 50 begins, so that for the bending stroke now taking place, the second safety space 31 must be released by the operator.

Insofar as it can be assumed after the intermediate stop that the second optical safety light barrier is concealed by the workpiece, as may be the case, for example, in the manufacture of a box-shaped workpiece, a subsequent stroke is triggered by a foot pedal to be continuously operated by the operator during the deformation process and at a reduced deformation speed.

What is claimed is:

1. A deforming machine with a machine frame on which an upper tool and a lower tool are arranged, at least one of which is received on the machine frame so as to be relatively movable along a movement path, wherein mutually oppositely arranged end faces of the upper tool and of the lower tool form a working gap of variable size, and wherein a first optical safety light barrier is associated with the upper tool or the lower tool, which first optical safety light barrier is used to protect a first safety space located adjacent to the working gap and which first optical safety light barrier comprises a first beam source for providing first safety light beams and a first light receiver for receiving the first safety light beams, the first beam source and the first light receiver being arranged on mutually opposite boundary surfaces of the first safety space, and a second optical safety light barrier being assigned to the machine frame or the upper tool, which comprises a second beam source for providing second safety light beams and a second light receiver for receiving the second safety light beams and which is designed for securing a second safety space, which is located in front of a largest surface of the upper tool, so that a projection of the second safety space onto the upper tool covers at least a section of the upper tool, the second beam source and the second light receiver being arranged on mutually opposite sides, wherein the second optical safety light barrier is designed for monitoring a third safety space, which extends downwards beyond the end face of the upper tool facing the lower tool along the movement path in the direction of the lower tool, so that a projection of the third safety space onto the working gap covers at least a section of the working gap, wherein a driving mechanism for initiating a relative movement along the movement path is associated with the upper tool arranged in a relatively movable manner on the machine frame and/or the lower tool received in a relatively movable manner on the machine frame, wherein the driving mechanism and the first optical safety light barrier and the second optical safety light barrier are connected to a safety control, which is designed to activate and deactivate the driving mechanism as a function of signals from the first optical safety light barrier and the second optical safety light barrier, the safety control being designed to activate the driving mechanism in order to reduce the distance between the upper tool and the lower tool when there is a predetermined distance between the upper tool and the lower tool and when an object penetrates into the third safety space.

2. The deforming machine according to claim 1, wherein the first and second safety space are cuboidal.

3. The deforming machine according to claim 1, wherein the mutually opposite boundary surfaces of the first safety space are aligned in the vertical direction.

4. The deforming machine according to claim 1, wherein the safety control is designed for switching off the driving mechanism during a reduction in the distance between the upper tool and lower tool when an object penetrates into the first safety space or into the second safety space or into the third safety space.

5. The deforming machine according to claim 1, wherein the safety control is designed for switching off an actuator with which a distance between the lower tool and a workpiece stop is set.

6. The deforming machine according to claim 5, wherein the distance between the lower tool and the workpiece stop is horizontally adjustable.

7. The deforming machine according to claim 1, wherein the upper tool is received in a relatively movable manner on the machine frame, and wherein the first optical safety light barrier is arranged on the upper tool, and wherein the second optical safety light barrier is arranged on the machine frame.

8. The deforming machine according to claim 7, wherein an adjusting device is arranged between the upper tool and the first optical safety light barrier, which is designed for adjusting a position of the first optical safety light barrier relative to the upper tool along the movement path.

9. The deforming machine according to claim 1, wherein the upper tool is received in a relatively movable manner on the machine frame, and wherein the first optical safety light barrier is arranged on the upper tool, and wherein the second optical safety light barrier is coupled with the first optical safety light barrier.

10. The deforming tool according to claim 9, wherein an adjusting device is arranged between the upper tool and the first optical safety light barrier, which is designed for adjusting a position of the first optical safety light barrier relative to the upper tool along the movement path.

11. The deforming machine according to claim 1, wherein the first optical safety light barrier and the second optical safety light barrier are designed for securing a front side of the upper tool and/or the lower tool facing the operator.

12. A method for operating a deforming machine, the method comprising:

monitoring a first safety space, which is arranged adjacent to a working gap of variable size which working gap is formed by end faces of an upper tool and a lower tool arranged opposite one another, with a first optical safety light barrier, wherein the monitoring of the first safety space during a reduction in distance between the upper tool and the lower tool takes place within a predetermined first distance interval for a distance between the upper tool and the lower tool and wherein the reduction in distance is terminated when an object enters the first safety space;

monitoring a second safety space, which is located in front of a largest surface of the upper tool and which, in the case of a projection transverse to the movement path, at least partially covers a largest surface of the upper tool, having a second optical safety light barrier, wherein the monitoring of the second safety space during a reduction in distance between the upper tool and the lower tool takes place within a predetermined second distance interval for a distance between the upper tool and the lower tool and wherein the reduction in distance is terminated when an object enters the second safety space; and monitoring a third safety space, which is located in front of the working gap and which at least partially covers the working gap in a projection transverse to the movement path, with the second optical safety light barrier, wherein the monitoring of the third safety space takes place during a standstill phase for the upper tool and the lower tool and wherein a change in distance between the upper tool and the lower tool is initiated, when an object enters the third safety space or leaves the third safety space after entering the third safety space.

13. The method according to claim 12, wherein a reduction in distance between the upper tool and the lower tool when an object penetrates into the third safety space is only initiated if a distance between the upper tool and the lower tool lies within a predetermined third distance interval.

14. The method according to claim 12, wherein a reduction in the distance between the upper tool and the lower tool is initiated upon penetration of an object into the third safety space only if a distance between the upper tool and the lower tool lies within a predetermined fourth distance interval.

15. The method according to claim 12, wherein a smallest distance amount of the first distance interval is greater than or equal to a largest distance amount of the predetermined second distance interval.

16. The method according to claim 13, wherein a minimum distance amount of the predetermined third distance interval is greater than or equal to a maximum distance amount of the predetermined second distance interval.

17. The method according to claim 14, wherein the predetermined fourth distance interval is equal to the predetermined second distance interval.

18. A method for operating a deforming machine, the method comprising:

monitoring a first safety space, which is arranged adjacent to a working gap of variable size which working gap is formed by end faces of an upper tool and a lower tool arranged opposite one another, with a first optical safety light barrier, wherein the monitoring of the first safety space during a reduction in distance between the upper tool and the lower tool takes place within a predetermined first distance interval for a distance between the upper tool and the lower tool and wherein the reduction in distance is terminated when an object enters the first safety space;

monitoring a second safety space, which is located in front of a largest surface of the upper tool and which, in the case of a projection transverse to the movement path, at least partially covers a largest surface of the upper tool, having a second optical safety light barrier, wherein the monitoring of the second safety space during a reduction in distance between the upper tool and the lower tool takes place within a predetermined second distance interval for a distance between the upper tool and the lower tool and wherein the reduction in distance is terminated when an object enters the second safety space; and monitoring a third safety space, which is located in front of the working gap and which at least partially covers the working gap in a projection transverse to the movement path, with the second optical safety light barrier, wherein the monitoring of the third safety space takes place during a standstill phase for the upper tool and the lower tool and wherein a change in distance between a workpiece stop relative to the upper tool or the lower tool is terminated when an object enters the third safety space.

\* \* \* \* \*